Patented May 9, 1939

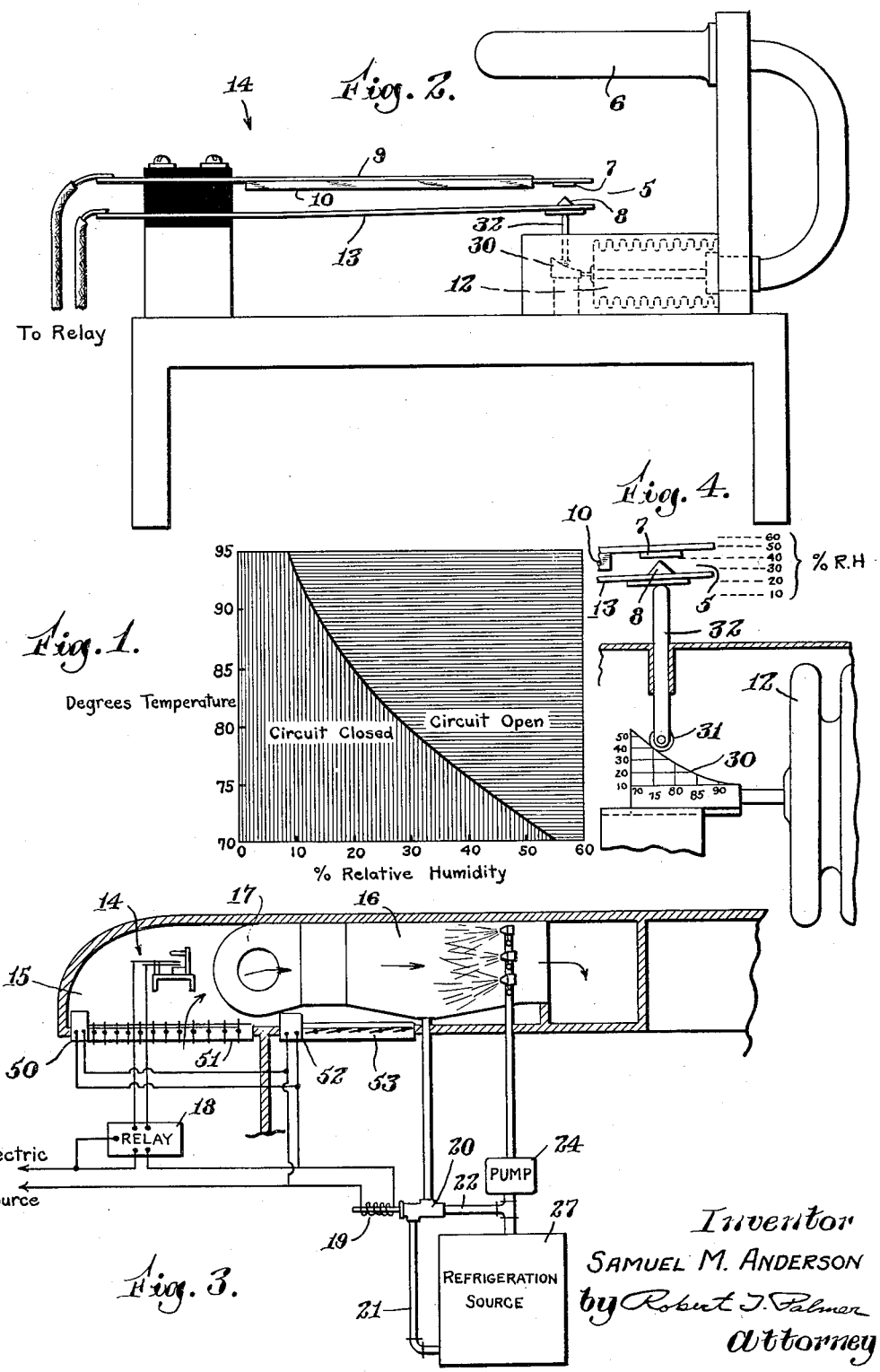

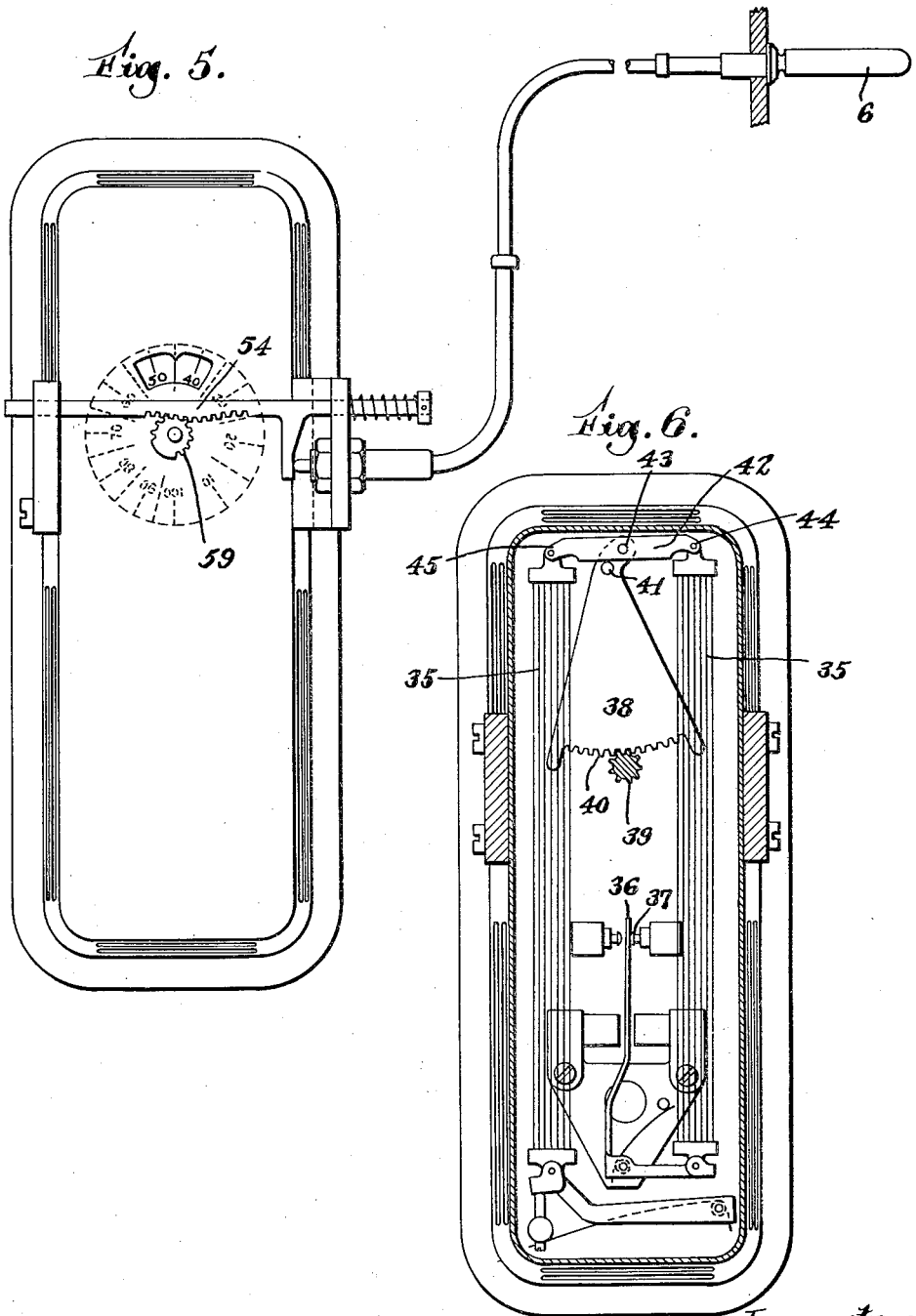

2,157,685

UNITED STATES PATENT OFFICE 2,157,685

AIR CONDITIONING SYSTEM UTILIZING REFRIGERATION

Samuel M. Anderson, Sharon, Mass., assignor to B. F. Sturtevant Company, Boston, Mass.

Application July 2, 1936, Serial No. 88,582
Renewed May 3, 1938

7 Claims. (Cl. 236—44)

This invention relates to air conditioning systems utilizing refrigeration and relates more particularly to an air conditioning system for passenger vehicles, combining evaporative cooling with cooling by refrigeration.

The passenger cars on some railroad lines on one continuous trip, pass through regions in which, in summer, different demands are made upon the air conditioning equipment. For example, a train may first pass through a region having a high wet bulb as well as a high dry bulb temperature, requiring considerable refrigerating energy for the dehumidification and cooling of the air. The train may next pass through a region having such a low wet bulb temperature that evaporative cooling may be effectively employed.

In my copending application, Serial No. 68,698, filed March 13, 1936, there is disclosed a comprehensive air conditioning system, utilizing spray coolers for cooling the air of a railroad passenger car, with a device responsive to wet bulb temperatures which signals to a train attendant when the wet bulb temperature is low enough for evaporative cooling to be effectively employed.

According to the present invention, there is provided a unique form of automatic control for switching the air conditioning system from cooling by refrigeration to cooling by evaporative cooling when the wet bulb temperature of the outdoor air drops to, say 60° F.

The ordinary wet bulb thermostat employing water is not suitable for railroad car work due to having to be placed in an inaccessible location; due to freezing of the water at times, and to other disadvantages, and according to this invention, there is provided a device which indicates when the wet bulb temperature is above or below a predetermined temperature, and which does not employ water. In one embodiment of the invention, a dry bulb thermostat and a hygrostat cooperate to close an electrical circuit when the wet bulb temperature is at or below a predetermined temperature, and to open the circuit when the wet bulb temperature is above a predetermined temperature. The closing of the circuit causes the air conditioning system to be switched from cooling by refrigeration to cooling by evaporative cooling.

An object of the invention is to cool air by sprays with evaporative cooling when the wet bulb temperature is below a predetermined temperature and to cool the air by refrigeration when the wet bulb temperature is above the predetermined temperature.

Another object of the invention is to provide a device responsive to dry bulb temperature and a device responsive to humidity changes, which cooperate to close an electrical current when the wet bulb temperature is at or below a predetermined temperature, and to open the circuit when the wet bulb temperature is above the predetermined temperature.

Other objects of the invention will be apparent from the following description taken with the drawings.

The invention will now be described with reference to the drawings, of which:

Fig. 1 is a chart illustrating the relation between relative humidities and dry bulb temperature for a 60° F., wet bulb temperature.

Fig. 2 is a view showing a dry bulb thermostat and a hygrostat in cooperative relationship according to this invention;

Fig. 3 is a diagrammatic view illustrating the application of the device of Fig. 2 for controlling a spray type air cooling system, according to this invention;

Fig. 4 is an enlarged view of a portion of the contact adjusting mechanism of Fig. 2;

Fig. 5 is a view of a mechanism for adjusting a standard type hair hygrometer to cause it to substantially follow the curve of Fig. 1, and Fig. 6 is a view of the interior of the hygrostat of Fig. 5 and illustrates the contact closing mechanism.

Operating experience has shown that for a given case, outdoor dry bulb temperature may be expected to vary between 70° F. and 95° F. At 60° F. wet bulb, a psychrometric chart shows that at these dry bulb temperatures, the relative humidities range between 56% and 9%. The chart of Fig. 1 illustrates this range. It is seen that for every point on the curve there is a different dry bulb temperature and a different relative humidity. An increase in relative humidity above or an increase in dry bulb temperature above that shown by the coordinates at any point on the curve will correspond to a wet bulb temperature above 60° F., and a decrease in relative humidity below or a decrease in dry bulb temperature below, that shown by the coordinates at any point on the curve, will correspond to a wet bulb temperature below 60° F.

The hygrostat element 5 and the dry bulb thermometer element of Fig. 2 are designed and adjusted to close an electrical circuit including the contacts 7 and 8 at points falling substantially along the curve of Fig. 1. The contacts will remain in contact at temperatures and relative humidities to the left of the curve and will separate at temperatures and relative humidities to the right of the curve.

The hygrostat element indicated generally by 5 comprises the metal spring member 9 to which is attached the hygroscopic member 10 which may be of the type of wood or other material generally used in hygrostats of this character. Increases in the relative humidity of the air adjacent the hygrostat 5 will cause the member 10 to absorb moisture and to bias the spray member 9 and the contact 7 away from the contact 8.

The thermometer bulb 6 is exposed to air having the same condition as that to which the hygrostat 5 is exposed and contains an expansible fluid such as mercury. The bulb 6 is connected by the tube 11 to the bellows 12, which expands and contracts upon increases and decreases respectively, in the temperature of the air adjacent the bulb 6. Decreases in the dry bulb temperature of the air will cause the diaphragm 12 to move the cam 30 to adjust the spring member 13 carrying the contact 8 upwardly, towards the contact 7, and increases in air temperature will cause the contact 8 to be biased away from the contact 7.

As shown by Fig. 4, the contact 7 moves downwardly under the influence of the hygroscopic member 10 as the relative humidities decrease. The cam 30 moved by the bellows 12 has a surface which contacts with the roller 31. The roller 31 is attached to the member 32 which bears against the lower side of the spring member 13 so that it adjusts the position of the contact 8 upon movement of the cam. The contact surface of the cam is shaped to cause the circuit including the contacts 7 and 8 to be closed at temperatures and relative humidities, substantially as shown by the curve of Fig. 1.

As shown by Fig. 3, the device is that shown by Fig. 2 and it is mounted in the fresh air intake 15 to the spray cooler 16 so as to be affected by the temperature and relative humidity of the air entering the system through the influence of the fan 17. The device 14 is connected to the relay 18. When the contacts within the device 14 are closed, when the wet bulb temperature is at or below 60° F., the relay 18 is energized and acts to energize the solenoid 19 which then actuates the valve 20 to close off the pipe line 21 to the refrigeration source 23, and to open the by-pass pipe line 22 to the pump 24, so that the water supplied to and returned from the sprays in the cooler 16, is recirculated for evaporative cooling. When the wet bulb temperature rises above 60° F. and evaporative cooling is ineffective, then the circuits are de-energized and the valve 20 is actuated to cause the cooling water to be supplied from the source of refrigeration 27.

When the relay 18 is energized by the device 14 to cause the system to operate in evaporative cooling, the damper motor 50 opens the fresh air dampers 51 to full open position and the damper motor 52 closes the recirculated air dampers 43 so that all outside air passes through the cooler 16.

When the system is switched by the device 14 to cooling by refrigeration, the damper motor 50 closes the outside air dampers 51 to a minimum position admitting, say 30% outside air. The motor 52 at the same time adjusts the recirculated air dampers to their open position.

Figs. 5 and 6 illustrate a standard type hair hygrostat which may be adjusted by the thermostat 6 to close the circuit at temperatures and relative humidities substantially as shown by the curve of Fig. 1, and which may be used in the system of Fig. 2 as substitution for the device 14.

Referring first to Fig. 6, the hair elements 35 expand upon the absorption of moisture and cause the contact 36 to approach the circuit closing contact 37. The contact 36 may be biased towards or away from the contact 37 by adjustment of the lever 38 by means of the gear 39 which meshes with the teeth 40 on the lever 38. The lever 38 is pivoted at 41 and its adjustment by the gear, to the right (facing the drawing) causes it to move the member 42 to which it is attached at its pivot point 43, so that its right hand end 44 moves downwardly and its left hand end 45 moves upwardly, thus biasing the contact member 36 towards the contact 37. Likewise, adjustment of the gear 39 in the other direction will cause the contact member 36 to be biased away from the contact 37.

Fig. 5 illustrates the mechanism for adjusting the mechanism of Fig. 6 to cause the circuit including the contacts 36 and 37 to be closed when the temperatures and relative humidities are substantially that along the curve of Fig. 1. The elliptical gear 59 on the shaft of the gear 39, and rack 54 cooperate under movement of the thermostat 6 to reset the hygrostat for every change in temperature so that for each dry bulb temperature, the hygrostat is reset to cause the circuit including the contacts 36 and 37 to be closed at points substantially on the curve of Fig. 1.

The details of the railroad car and of the air conditioning system have not been described since they may be easily understood with reference to my co-pending application, above referred to.

For the purpose of illustration, the governing wet bulb temperature has been chosen as 60° F. for the reason that a system utilizing that control temperature has been designed and operated satisfactorily. However, where due to different climatic reasons or for other reasons, a different control temperature is preferred, reference to any standard psychrometric chart will furnish charts for a new curve corresponding to Fig. 1 and any-one skilled in the art would be able to design and adjust a device to substantially follow the new curve.

While one embodiment of the invention has been described for the purpose of illustration, it should be understood that the invention is not to be limited to the exact arrangement described, as many departures and modifications will suggest themselves to those skilled in the art, after having had access to this disclosure.

What is claimed is:

1. Air conditioning apparatus comprising a spray cooler, means for passing outside air through said cooler and for discharging it into the space to be conditioned, refrigerating means for cooling and supplying a fluid to said cooler, means for discontinuing the cooling of said fluid by said refrigerating means and for converting said apparatus for evaporative cooling, and means responsive to the dry bulb temperature and relative humidity of the outside air entering said cooler for actuating said last mentioned means when the wet bulb temperature of the outside air is below a predetermined temperature.

2. Air conditioning apparatus comprising a spray cooler, means for passing outside air through said cooler and for discharging it into the space to be conditioned, refrigerating means for cooling and supplying a fluid to said cooler, means for discontinuing the cooling of said fluid by said refrigerating means and for converting said apparatus for evaporative cooling, and means responsive to the dry bulb temperature and relative humidity of the outside air entering said cooler for actuating said last mentioned means when the dry bulb temperature is below a predetermined point for a predetermined relative humidity, or the relative humidity is below a predetermined point, for a predetermined dry bulb temperature.

3. Air conditioning apparatus comprising a spray cooler, means for passing outside air through said cooler and for discharging it into the space to be conditioned, refrigerating means for cooling and supplying a fluid to said cooler, means for discontinuing the cooling of said fluid by said refrigerating means and for converting said apparatus for evaporative cooling, and a hygrostat and a dry bulb thermostat exposed to the outside air entering said cooler, said hygrostat and said thermostat cooperating to actuate said last mentioned means when the wet bulb temperature of the outside air is below a predetermined point.

4. Air conditioning apparatus comprising a spray cooler, means for passing outside air through said cooler and for discharging it into the space to be conditioned, refrigerating means for cooling and supplying a fluid to said cooler, means for discontinuing the cooling of said fluid by said refrigerating means and for converting said apparatus for evaporative cooling, and a hygrostat and a dry bulb thermostat exposed to the outside air entering said cooler, said hygrostat and said thermostat cooperating to actuate said last mentioned means when the dry bulb temperature is below a predetermined point for a predetermined relative humidity, or the relative humidity is below a predetermined point for a predetermined dry bulb temperature.

5. Air conditioning apparatus comprising a spray cooler, means for passing outdoor air and recirculated air from the space served through said cooler, volume control means for adjusting said means for varying the proportion of outdoor air to recirculated air, means responsive to changes in the relative humidity of the outdoor air entering said cooler, means responsive to changes in the dry bulb temperature of the outdoor air entering said cooler for adjusting said humidity responsive means to respond to changes in the wet bulb temperature of the outdoor air entering said cooler, and means controlled by said humidity responsive means for actuating said volume control means to increase the proportion of outdoor air when the wet bulb temperature of the outdoor air is below a predetermined point, and to increase the proportion of recirculated air when the wet bulb temperature of the outdoor air is above said point.

6. Air conditioning apparatus comprising a spray cooler, means for passing outdoor air and recirculated air from the space served through said cooler, volume control means for adjusting said means for varying the proportion of outdoor air to recirculated air, means responsive to changes in the relative humidity of the outdoor air entering said cooler, means responsive to changes in the dry bulb temperature of the outdoor air entering said cooler for adjusting said humidity responsive means to respond to changes in the wet bulb temperature of the outdoor air entering said cooler, and means controlled by said humidity responsive means for actuating said volume control means to discontinue the supply of recirculated air to said cooler when the wet bulb temperature of the outdoor air is below a predetermined point.

7. Air conditioning apparatus comprising a spray cooler, means for passing outdoor and recirculated air from the space served through said cooler, volume control means for adjusting said means for varying the proportion of outdoor air to recirculated air, a hygrostat, a dry bulb thermostat, means actuated by said thermostat for adjusting said hygrostat to respond to changes in the wet bulb temperature of the outdoor air entering said cooler, and means controlled by said hygrostat for actuating said volume control means to increase the proportion of outdoor air when the wet bulb temperature of the outdoor air is below a predetermined point, and to increase the proportion of recirculated air when the wet bulb temperature of the outdoor air is above said point.

SAMUEL M. ANDERSON.